US011775989B1

(12) United States Patent
Hao et al.

(10) Patent No.: US 11,775,989 B1
(45) Date of Patent: Oct. 3, 2023

(54) SYSTEMS AND METHODS FOR OMNICHANNEL ENVIRONMENT RELEVANCE ANALYTICS

(71) Applicant: Brand3P Incorporated, Palo Alto, CA (US)

(72) Inventors: Ping Hao, Palo Alto, CA (US); Burke Miller White, San Anselmo, CA (US); Daniel Quynh-Hung Nguyen, Palo Alto, CA (US); Peter Andrew Zelasney, New York, NY (US)

(73) Assignee: BRAND3P INCORPORATED, Palo Alto, CA (US)

( * ) Notice: Subject to any disclaimer, the term of this patent is extended or adjusted under 35 U.S.C. 154(b) by 457 days.

(21) Appl. No.: 17/070,837

(22) Filed: Oct. 14, 2020

Related U.S. Application Data

(60) Provisional application No. 62/914,925, filed on Oct. 14, 2019.

(51) Int. Cl.
| | |
|---|---|
| *G06Q 30/0201* | (2023.01) |
| *G06Q 30/0601* | (2023.01) |
| *G06Q 30/0282* | (2023.01) |
| *G06F 16/22* | (2019.01) |
| *G06N 20/00* | (2019.01) |
| *G06Q 10/0639* | (2023.01) |

(52) U.S. Cl.
CPC ......... *G06Q 30/0201* (2013.01); *G06F 16/22* (2019.01); *G06N 20/00* (2019.01); *G06Q 10/06393* (2013.01); *G06Q 30/0627* (2013.01); *G06Q 30/0629* (2013.01); *G06Q 30/0282* (2013.01)

(58) Field of Classification Search
None
See application file for complete search history.

(56) References Cited

U.S. PATENT DOCUMENTS

| | | | | |
|---|---|---|---|---|
| 10,354,262 B1 * | 7/2019 | Hershey | ............... | H04L 67/535 |
| 2008/0270363 A1 * | 10/2008 | Hunt | .................. | G06F 16/2462 |

(Continued)

FOREIGN PATENT DOCUMENTS

| | | | | | |
|---|---|---|---|---|---|
| KR | 100955289 B1 * | 4/2010 | | ......... | G06Q 30/0201 |
| WO | WO-2014014473 A1 * | 1/2014 | | ....... | G06F 16/24578 |

OTHER PUBLICATIONS

J. Li, B. Shao, J. Xu, H. Li and Q. Wang, "A big data based product ranking solution," 2016 IEEE International Conference on Service Operations and Logistics, and Informatics (SOLI), Beijing, China, 2016, pp. 190-194, doi: 10.1109/SOLI.2016.7551685. (Year: 2016).*

(Continued)

*Primary Examiner* — Mehmet Yesildag
(74) *Attorney, Agent, or Firm* — POLSINELLI LLP

(57) ABSTRACT

Disclosed embodiments may provide a framework to implement an omnichannel relevance analysis system. In response to a request to obtain an omnichannel relevance for a product, the system identifies a set of relevancy attributes and domain priorities and obtains product data sets associated with a set of platforms through which the product is made available. Using these product data sets, the system generates an omnichannel relevance index to indicate a position of the product in relation to sets of other products made available within the set of platforms.

20 Claims, 8 Drawing Sheets

(56) References Cited

U.S. PATENT DOCUMENTS

| | | | | |
|---|---|---|---|---|
| 2008/0288889 A1* | 11/2008 | Hunt | .................. | G06Q 30/02 |
| | | | | 715/810 |
| 2008/0294996 A1* | 11/2008 | Hunt | .................. | G06Q 30/02 |
| | | | | 707/999.102 |
| 2008/0319829 A1* | 12/2008 | Hunt | .............. | G06Q 30/0201 |
| | | | | 705/7.29 |
| 2009/0006156 A1* | 1/2009 | Hunt | .................. | G06Q 10/063 |
| | | | | 705/7.11 |
| 2015/0254682 A1* | 9/2015 | Grandt | ............ | G06Q 30/0201 |
| | | | | 705/7.29 |
| 2016/0373396 A1* | 12/2016 | Sorg | .................... | H04L 51/52 |
| 2019/0163758 A1* | 5/2019 | Zhivotvorev | ..... | G06F 16/24578 |
| 2019/0164069 A1* | 5/2019 | Zhivotvorev | .......... | G06N 20/00 |
| 2020/0005087 A1* | 1/2020 | Sewak | .............. | G06V 10/454 |

OTHER PUBLICATIONS

Lei Tang, "Thresholding for Top-k Recommendation with Temporal Dynamics", arXiv:1506.02190v2, https://doi.org/10.48550/arXiv.1506.02190 (Year: 2015).*

* cited by examiner

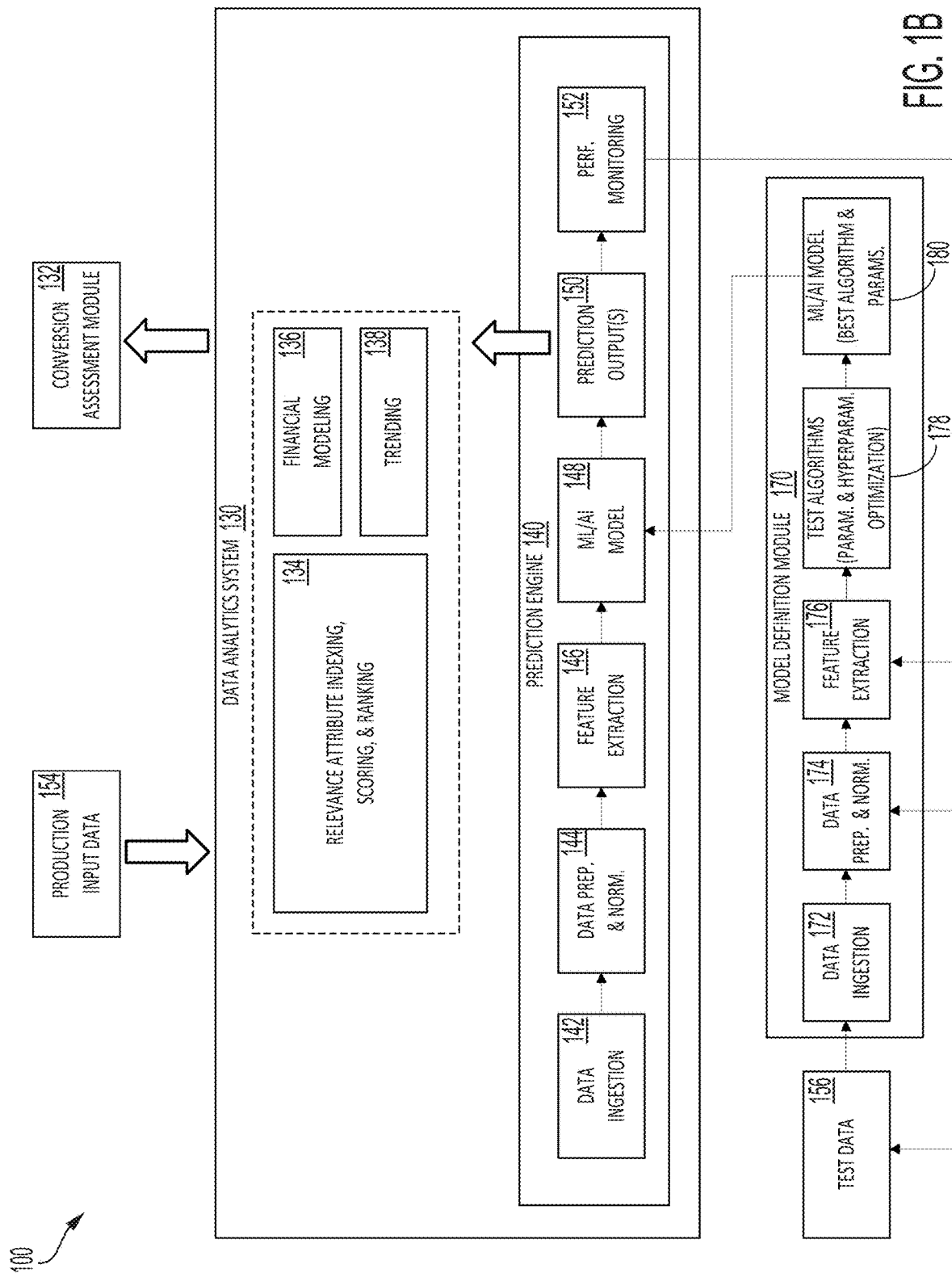

| AMAZON | NORDSTROM | BLOOMINGDALES | MACYS.COM | WALMART.COM |
|---|---|---|---|---|
| Clifton Heritage | TORY BURCH | Tumi | Tumi | Mens Wallet |
| Timberland | KATE SPADE NEW YORK | COACH | Michael Kors | Access Denied |
| Tommy Hilfiger | TUMI | Shinola | GUESS | Alpine Swiss |
| TUMI | GUCCI | kate spade new york | kate spade new york | AllTopBargains |
| Amazon Essentials | BURBERRY | Tory Burch | Sakroots | Marshal |
| Michael Kors | HERSCHEL SUPPLY CO | Smythson | Levi's | Nijex |
| ESTALON | MCM | Frye | Fossil | ID Stronghold |
| Columbia | OFF-WHITE | Michael Kors | Royce Leather | Gearonic |
| Lavemi | PRADA | MARC JACOBS | Nine West | CoreLife |
| Buffway | SAINT LAURENT | Furla | COACH | Travelon |
| Chelmon | BALENCIAGA | ROYCE New York | Kenneth Cole | George |
| Spiex | GIVENCHY | Bric's | Lacoste | Fintie |
| Shevrov | SHINOLA | Polo Ralph Lauren | Lauren Ralph Lauren | 22 Broadway |
| NYCstore | CALPAK | | Dooney & Bourke | Zodaca |
| Coach | BELLROY | | Vera Bradley | JEFFENLY |
| Herschel | SALVATORE FERRAGAMO | | Dopp | AOD |
| TRAVANDO | MARC JACOBS | | Tommy Hilfiger | Coolmade |
| Zitahli | DAGNE DOVER | | The Sak | Leatherboss |
| VBAX | MADEWELL | | Calvin Klein | Mignova |
| Fossil | REBECCA MINKOFF | | Patricia Nash | SBR Designs |

FIG. 6

SYSTEMS AND METHODS FOR OMNICHANNEL ENVIRONMENT RELEVANCE ANALYTICS

CROSS REFERENCE TO RELATED APPLICATIONS

This application claims priority of provisional U.S. Application No. 62/914,925, filed Oct. 14, 2019, which is incorporated by reference herein its entirety.

BACKGROUND

The present disclosure generally relates to online, omnichannel environments. More specifically, the present disclosure relates to systems and methods for omnichannel environment analytics.

The explosive growth of online omnichannel environments provides users millions of choices as to what to buy, when to buy, how to buy, and more recently, how to receive a purchased product, whether dropped into the back of the user's car or delivered directly onto the refrigerator shelf within hours. No longer is a store limited to offering on its shelves during opening hours. Users choose from over 300 million products and well over a million brands on a single global omnichannel environment with many thousands of product categories to choose from without leaving their homes. With the advent of this "endless aisle", small businesses, mass merchant and specialty retailers, along with global products companies now compete around the clock for attention and sales conversion, resulting in the upheaval of traditional rules of product development, marketing, selling, merchandising, manufacturing, supply chain, and logistics.

Business users must innovate faster than ever before and compete in more ways across product development, manufacturing, and distribution. Seconds matter when technology algorithms, predominately search on omnichannel environment platforms serve up the closest match to a shopping action. As global omnichannel environments proliferate to millions of available products, business users must participate on these omnichannel environments or risk losing customers and exposure. Omnichannel environments are fast becoming the preferred shopping channel on these global omnichannel environments for their broadest selection, best pricing, and desirable delivery choices.

In order to develop and sell products that meet the needs of user demand and buying behavior, business users require new methods of relevance in order to understand which products are selling and why. With these insights based on these vast omnichannel environment platform data sets, suppliers/retailers would be able to develop new products and create new offers that capture the largest share of the user wallet. Business users need to anticipate, plan, and invest based on how well their own products are currently being found or not found on an omnichannel environment platform through search, browse, and other custom curated experiences. Since users have a wide range of navigation choices on digital shopping platforms, the importance of knowing when to take specific actions to improve the likelihood of success on a digital shopping platform can determine success or failure. The common challenge facing business users on a global omnichannel environment is search optimization (e.g., "how can my products be found on the first two pages of a product search on a marketplace with 300 million different products?"). This is analogous to product placement in physical retail environments, where business users have been constantly battling for preferred shelf space and in-store merchandising. In the context of online omnichannel environments, however, there may be a variety of ways product searches may be conducted where often business users generally have little visibility into such highly dynamic processes.

In the past, retailers were responsible for choosing which products would be purchased, inventoried, offered and promoted to the end user. Whether this was in a physical retail store or on an owned, digital channel, the retailer's buyers and merchandisers made decisions that affected the outcome of what products the user encountered. Today, eCommerce technologies and scale have created a retail environment where more products are potentially available for user promotion than ever before. Of all the retail channels currently available, none is more complex than an omnichannel, digital environment. These commerce platforms offer products from a wide array of sources, whether it is sold by the omnichannel environment platform itself, first-party, or by third-party sellers that can be both legitimate and sometimes illegitimate. All of these products are now available for the user to buy.

It is in this chaotic environment, few business users know which products from their catalog are available on which omnichannel environment, through which known partners, and at what price. Traditional retail relationships collide with ever-evolving, new approaches such as competitors who were former suppliers that are now selling similar products at lower prices directly to the user. With many more competitors and blurred distribution channels on the hyper-competitive global omnichannel environment platforms, a business user's relative position as to how often they are presented and purchased to the user can fluctuate wildly, making it difficult for businesses to build and invest in business priorities fundamental to the success of their eCommerce business growth and profitability.

Today, business users may be surprised to find unexpected new competitive product entrants entering the market overnight from international markets or oftentimes a private label entrant from the omnichannel environment platform itself as in the example of Amazon Basics. Online omnichannel environments are now the preferred place for users (e.g., 68% according to some sources of market data as of 2019) to start their process of finding and learning about products to buy. Business users need a way to understand whether their products can be found by users, whether their products show up in the top product results quickly and reliably, how to improve upon a current position, and track such position or status over time.

Omnichannel environment product data models have evolved past the traditional business user's product description to contain many different attributes that hyperextend categorization from a general category to a multi-tiered taxonomy composed of thousands of categories and sub-categories that are ever expanding. Since each omnichannel environment has its own unique differentiated data taxonomy for product categories, even figuring out which specific category the business user's products should be listed for highest probability of user discovery becomes challenging. For example, a category for slippers on Amazon is not the same as a category on eBay, Walmart.com, or other international omnichannel environments. Further, the search algorithms and buy box algorithms within these omnichannel environments are vastly different as well.

Many business users obtain product and market data analytics for their products manually. This approach is much slower and provides limited data range and depth needed to make impactful business decisions on the hyper-competitive omnichannel environment. The result is that these business users miss out on potential exposure and user shopping behavior and consequently get sidelined by other competitors. The more advanced ways to analyze product and market data analytics are limited to a singular method of discovery through search. This approximation assumes that users primarily use search, but as often is the case, this is not fully representative of the actual customer experience which is often more complex.

Users find products on a global omnichannel environment predominantly in these ways: search and browse and/or a combination of these navigational pathways. Search comes in two forms: either a branded search or generic product keyword search. Since 70% of purchases begin with a generic keyword search, the business user may seek to secure the highest level product listing for their product amongst the product listing results shown as a result of a keyword search. As discussed herein, such generic product searches are not uniform or consistent, thereby complicating the task of even identifying a business user's relative position within each different market let alone optimize their position. The other way is through browse, whereby the omnichannel environment platform exposes site navigation. Site navigation is distinctive to each omnichannel environment. Some omnichannel environments derive higher conversion through search while others through browse interactions, with further dependencies on taxonomy and categorization. These differences in user pathways to conversion further complicate a business user's ability to prioritize investments to improve discoverability and exposure.

There is, therefore, a need in the art for improved systems and methods for omnichannel environment analytics that provide relevance scoring and rankings across the omnichannel environment.

BRIEF DESCRIPTION OF THE DRAWINGS

The present disclosure is described in conjunction with the appended Figures:

FIGS. 1A-1B show an illustrative example of an environment in which an omnichannel relevance analysis system generates an index, rank, and score of relative positioning in comparison to their known and often unknown competitors in accordance with various embodiments;

FIG. 6 shows an illustrative example of a brand relevance index brand ranking across multiple omnichannel environments in accordance with at least one embodiment.

Figure 1A:
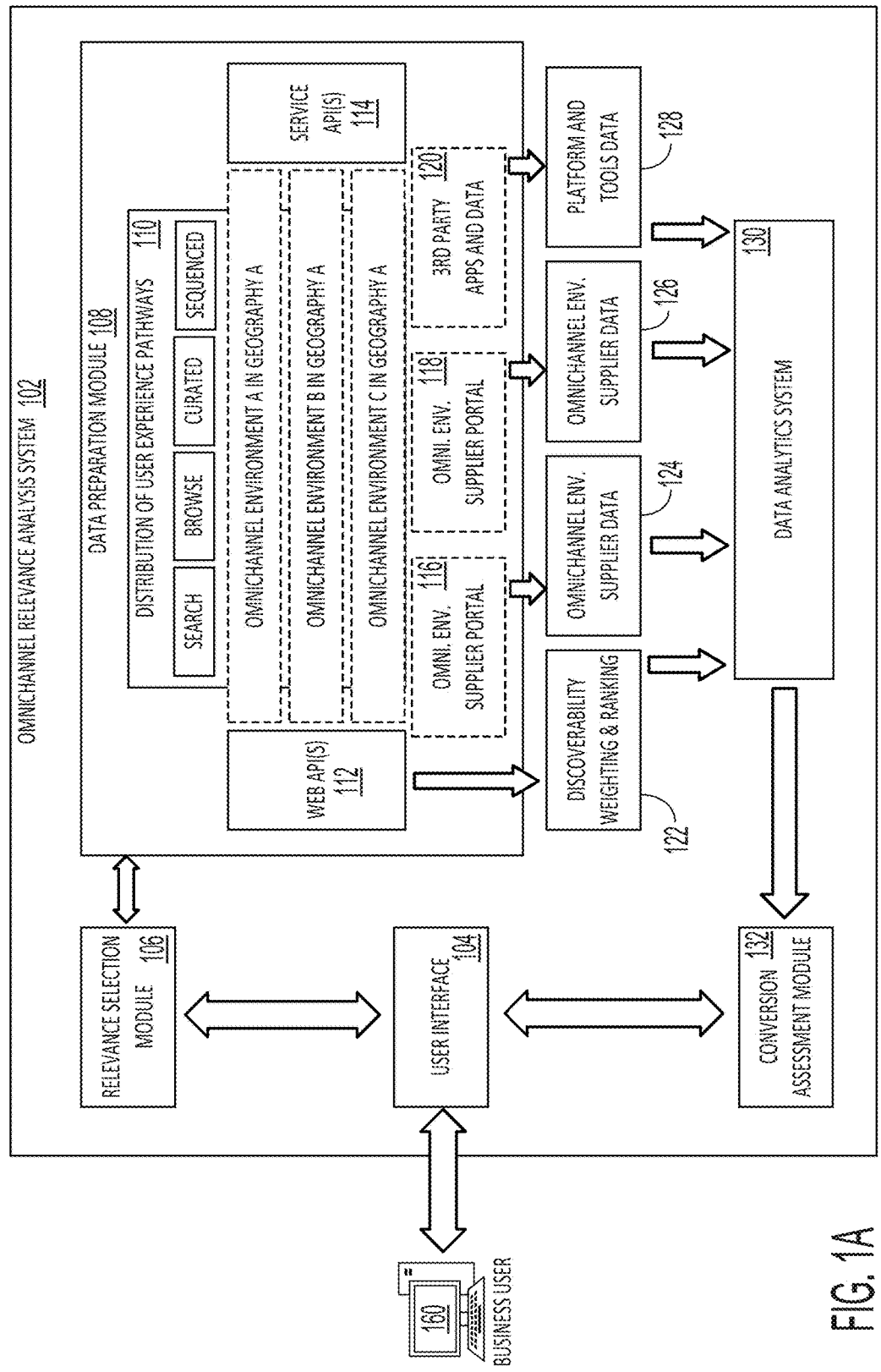

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Embodiments of the present disclosure include a multi-component system for omnichannel environment analytics with relevance indexing, scoring, and ranking algorithms to measure and represent relevance attribute position and share in a consistent and repeatable way. Such quantified data may therefore further provide such representation of position and share that associates a percentage of the share of user discovery held by a particular product, brand, or selected attribute for any given search, browse, or customer experience in a single and/or multiple omnichannel environment cohort. Such share analytics and rankings provide a basis for estimated revenue and profitability with trending and forecasting needed to associate the impact of actions taken to improve the relevance attribute score. As used herein, an omnichannel environment may include eCommerce or other online marketplace or retailer environment, such as an online store or marketplace.

Relevance attribute index scoring and ranking is based on a set of scoring algorithms that aggregate multiple input sources including publicly available, user-facing data sources (e.g. search results) and privately available data sources (e.g. ingested product catalog, best-selling products) provided by the eCommerce platforms to the business user such as Amazon's Seller Central, Amazon's Vendor Central and Walmart's Seller Central, and the like. Inputs to this scoring algorithm may also include relevant data available through application programming interfaces (APIs) from various eCommerce analytics and software and global omnichannel environment platforms, as well as highly verticalized input data sources from advanced advertising optimization platforms and marketing technology software. The resulting omnichannel environment relevance scoring and ranking may further be used to identify customer preference behavior by target audience and adoption of brands, product attributes and packaging, providing brand-specific patterns, trends, and other data that give a business user insight into its performance across different environments and platforms at a more granular level than previously available.

With this system, business users may further be able to understand (1) whether their products are considered "discoverable" through search, browse, or curated experience or a combination (2) where a business user ranks against competitors in a defined industry or environment; and (3) data indicators associated with the rankings so that the business user can ascertain appropriate actions to improve ranking position and, thus, performance. For example, a carry-on luggage company may obtain data on what international carry-on luggage are in the top 10 brands selling on Amazon or Google Shopping, as well as what characteristics or attributes are the same or differentiated (e.g., four spinner wheels, common brand, average price of $250, etc.). The method behind relevance scoring can also be used to estimate other metrics that business users and channel partners may need to further improve channel visibility and optimize business decisions. In addition, artificial intelligence and machine learning is applied to refine the generated aggregated data view, apply criteria, and determine relevant metrics to provide yet more granular results tailored to the specific environment, brand, and product. As a result, benchmarks and comparisons can be made to support business decisions and predict normalized forecasted behavior based on variable inputs and referenced outputs.

There are many steps a business user takes to create and present a high quality product offer to a user. These steps include establishing agreements with varying business terms, creating product content in images and detailed descriptions, following rigorous item setup requirements for a taxonomy specific to an omnichannel environment, adhering to strict policies on fulfillment, customer service, and returns, and finally, working with online merchants on merchandising campaigns. Inevitably, each of these steps may be complex, based on relationships, and differ across different global omnichannel environments. Often, this complexity results in a business user focused on optimizing for brand searches instead of generic product keyword searches.

Embodiments of the present disclosure therefore provide a way for the business user to see and act on their relative product position across single or multiple global omnichannel environments for generic product search, browse, and curated experience from the user's point of view. Further, omnichannel environment relevance analytics and indexing methods may be provided, as well as scoring and ranking systems that uses information associated with multiple data sets of characteristics and signals that determine the relative position of products by importance to current share and user discovery. Such relevance omnichannel environment indexing methods may include querying multiple data sources within the omnichannel environment data taxonomy consisting of categories, products, product attributes, channels, fulfillment together with customer feedback (e.g., ratings, reviews, etc.) and external omnichannel environment metrics to create a data model that adjusts to the highly dynamic nature of global omnichannel environments.

FIGS. 1A-1B show an illustrative example of an environment 100 in which an omnichannel relevance analysis system 102 generates a rank and score of relative positioning in comparison to their known and often unknown competitors in accordance with various embodiments. In the environment 100, a business user 160 accesses an omnichannel relevance analysis system 102 via a user interface 104 through which the business user 160 may define the relevancy attributes important to their specific business across the relevant eCommerce environments to be measured. The user interface 104 may be web-based, whereby the business user 160 may access the user interface 104 through a web browser application or through any application that enables the business user 160 to access a particular network address (e.g., Uniform Resource Identifier (URI), etc.) associated with the omnichannel relevance analysis system 102. In some embodiments, the business user 160 may utilize a local omnichannel relevance analysis system application, through which the business user 160 may access the user interface 104 and define the relevancy attributes. Thus, the omnichannel relevance analysis system 102 may be implemented on a remote network accessible via a network address or may be implemented using stand-alone computer systems or applications operated within a business user's network.

In an embodiment, the omnichannel relevance analysis system 102 includes a relevance selection module 106, which is configured to narrow the selection criteria by allowing a business user 160 to define priorities to available relevancy attributes. The relevance selection module 106 may be implemented as executable code or instructions executed by a computer system of the omnichannel relevance analysis system 102. Alternatively, the relevance selection module 106 may be implemented as a stand-alone computer system or application executing on a computer system utilized by the omnichannel relevance analysis system 102. The relevance selection module 106 may include a repository of known or otherwise available relevancy attributes that may be selected by the business user 160 as parameters for determining the omnichannel environment analytics and rankings for the selected relevancy attributes. For instance, when a business user 160 utilizes the user interface 104 provided by the omnichannel relevance analysis system 102, the relevance selection module 106 may update the user interface 104 to provide the business user 160 with various relevancy attributes from which the business user 160 may select a subset of relevancy attributes for its search.

In an embodiment, based on the initial set of relevancy attributes selected by the business user 160 via the user interface 104, the relevance selection module 106 dynamically identifies and characterizes other possible relevancy attributes that may be of interest to the business user 160. For instance, through the user interface 104, the business user 160 may specify an initial set of relevancy attributes, one or more domain priorities, specific online omnichannel environments with which the business user 160 engages, and specific products and product lines that may be listed in each online omnichannel environment specified by the business user 160. In an embodiment, relevancy attributes are derived from a product or product set specified by the business user 160 via the user interface 104. This can take the form of an attribute type such as a brand name, product title, product identifier, and the like. Examples of relevancy attributes may include brand name, product type, product rating, category, style, price, shipping method, first party, drop ship, or third party channel, seller performance, types of sellers, geographic region, and the like. Attributes may further include user ratings and reviews, type and intensity of omnichannel environment advertising, social media integration, and other emerging omnichannel environment data sets. Relevancy attributes may be combinations of sets of attributes that can employ priority, distribution, and hierarchy.

The domain priorities may define a single or multiple omnichannel environment platforms, comprising various types of entities (e.g., physical stores, online retailers, etc.) that may deploy a variety of channels including wholesale, drop ship, third party, etc. across various geographic regions. Domain priorities can be assigned across these domains to understand the relative position and importance of the attribute. A business user 160 can prioritize multiple omnichannel environment platforms as part of this domain priority due to the variation of contributing data sets which are to be normalized in order to provide a broader representative data set. Domain prioritization can also take into consideration the format of digital delivery including mobile, desktop, web browser, application, etc.

In an embodiment, the relevance selection module 106 provides the selected relevancy attributes, domain priorities, and the specific online omnichannel environments specified by the business user 160 to the data preparation module 108. The data preparation module 108 may identify a distribution of user experience pathways 110 through which multiple data sources may be aggregated and processed to inform downstream discoverability processed by the relevancy attribution algorithms described in greater detail herein. The data preparation module 108 may be implemented as executable code or instructions executed by a computer system of the omnichannel relevance analysis system 102. Alternatively, the data preparation module 108 may be implemented as a stand-alone computer system or application executing on a computer system utilized by the omnichannel relevance analysis system 102.

In an embodiment, the omnichannel relevance analysis system 102, via the relevance selection module 106 and the data preparation module 108, implements a relevancy attribute verification feedback mechanism, which validates the relevancy attributes made available by the relevance selection module 106 to business users to ensure that the model used to determine the omnichannel environment analytics and rankings based on the selected relevancy attributes is flexible and adaptable to the latest omnichannel environment taxonomy and catalog data sets. For instance, when a business user 160 provides, via the user interface 104, an initial set of relevancy attributes, domain priorities, specific online omnichannel environments with which the business user 160 engages, and specific products and product lines that may be listed in each online omnichannel environment specified by the business user 160, the data preparation module 108 may interact with the specific online omnichannel environments to identify any additional and/or alternative relevancy attributes that may be of interest to the business user 160. For instance, the data preparation module 108 may submit one or more product queries, using web application programming interfaces 112, to the specific online omnichannel environments identified by the business user 160. These queries may correspond to the specific products/product lines and initial relevancy attributes specified by the business user 160. Based on these queries, the data preparation module 108 may identify additional and/or alternative relevancy attributes that may be of interest to the business user 160 or that otherwise may be more relevant for the business user's purposes.

The data preparation module 108 may provide these additional and/or alternative relevancy attributes to the relevance selection module 106, which may present these additional and/or alternative relevancy attributes to the business user 160 via the user interface 104. The business user 160 may update its selection of relevancy attributes and otherwise revise its request (e.g., refine domain priorities, select different or additional product types, etc.) and provide these to the relevance selection module 106. The aforementioned process may be repeated until the business user 160 is satisfied with the relevancy attributes it has selected and indicates such to the relevance selection module 106 via the user interface 104. Thus, the relevance selection module 106 and data preparation module 108 may perform an iterative and dynamic process, in real-time, to provide the business user 160 with verified relevancy attributes that represent the latest omnichannel environment taxonomy and catalog data sets for the omnichannel environments indicated by the business user 160.

Once the business user 160 has finalized selection of the relevancy attributes for which the business user 160 wishes to obtain a relevancy attribute indexing, scoring and ranking for its product and/or product type, the data preparation module 108 may access the specified omnichannel environments, as well as any available third party data sources associated with the specified omnichannel environments, to obtain various data sets that may be used to determine the relevancy attribute scoring and ranking for the product and/or product type specified by the business user 160. As described above, the data preparation module 108 may submit one or more product queries, using web APIs 112, to the specific online omnichannel environments identified by the business user 160. Through these web APIs 112, the data preparation module 108 may obtain discoverability weighting and ranking data 122 that may be used to determine the product and/or product type positioning within the various omnichannel environments identified by the business user 160.

The discoverability weighing and ranking data 122 may be obtained using the aforementioned web APIs 112 via the distribution of user experience pathways 110 across the multiple domain priorities defined by the business user 160. The distribution of user experience pathways 110 may comprise a singular or combination of keyword search, browsing, digital shelf navigation, a multi-step sequence and the like. The various platforms associated with the selected omnichannel environments, as well as their corresponding algorithms, may present relevant user-facing data in the form of product listings and sponsored digital advertisements in the order that have the most potential for user discovery. The products identified as having the top listing position may be weighted to have higher current potential and subsequent follow-on listings may be weighed accordingly.

The data preparation module 108 may further access omnichannel environment portals 116-118 to obtain omnichannel environment data 124-126. The omnichannel environment portals 116-118 may maintain data related to product onboarding and supply management for the corresponding omnichannel environment identified by the business user 160. Through these portals 116-118, the data preparation module 108 may obtain product catalogs along myriad product categories and relevancy attributes, as selected by the business user 160. These portals may be accessed via one or more service APIs 114 corresponding to backend services associated with the selected omnichannel environments.

The data preparation module 108 may further access third party applications and data sources 120 to obtain platform and tools data 128. The third party applications and data sources 120 may include any third party services that may monitor, obtain, and aggregate data across various omnichannel environment platforms. Further, the third party applications and data sources 120 may include any applications and/or data sources associated with third party sellers of products and product types, leveraging resources provided by the omnichannel environments identified by the business user 160. The data obtained from these third party applications and data sources 120 may include platform and tools data 128, which may comprise data related to third party sellers of products through the omnichannel environments identified by the business user 160. Further, the platform and tools data 128 may include financial or other performance data, product data, and the like obtained from the omnichannel environment and/or resource platforms and aggregated by a third party service.

The data obtained by the data preparation module 108 may be provided to a relevancy attribute data analytics system 130. The relevancy attribute data analytics system 130 includes the relevancy attribute index scoring and ranking algorithms 134, which may use actual financial data (e.g., production input data 154) to inform financial modeling 136 as well as baselining and trending behavior 138, as illustrated in FIG. 1B. The production input data 154 may include the various data 122-128 described above. The relevancy attribute data analytics system 130 may be implemented as executable code or instructions executed by a computer system of the omnichannel relevance analysis system 102. Alternatively, the relevancy attribute data analytics system 130 may be implemented as a stand-alone computer system or application executing on a computer system utilized by the omnichannel relevance analysis system 102.

To generate the relevance index, ranking and scoring, the relevancy attribute index scoring and ranking algorithms 134 may incorporate the rank of the resultant product listing, r, the relevant size of the data set, n, and the number and weighing inputs as described herein, which may vary based on product category and omnichannel environment platform. For instance, in the commoditized product categories sold online, user behavior may look at the first page of data, which may have n=40, whereas for home décor categories, a representation for brand relevance may have n=100. A business user 160 may select the parameter n that is suitable for their brand and product categories to obtain an accurate relevancy ranking. A higher value for n can be selected to increase the scope of discoverability weighting ranking to determine the broadest range of participating entities in an environment. Alternatively, a lower value for n may be selected to focus on securing brand leadership. The parameter n may also be based on the number of quality results that are to be considered, which can often vary based on the search results from a specific omnichannel environment platform.

In an embodiment, the relevancy attribute data analytics system 130 includes a prediction engine 140, which may implement a machine learning/artificial intelligence model 148 that is used to determine the ideal parameters for rapid and accurate relevance scoring and ranking. The prediction engine 140 may use, as input, the relevance attribute scoring and ranking generated by the relevancy attribute index scoring and ranking algorithms 134. Further, the prediction engine 140 may use the production input data 154, which may include the various data sets 122-128 described above, as input. The relevance attribute scoring and ranking, as well as the production input data 154 may be ingested via a data ingestion process 142 and the aggregated data is processed and normalized via a data preparation and normalization process 144. The prediction engine 140 may further utilize a feature extraction process 146 to determine which variables and/or their derivatives are likely to have the best impact on the outputs.

The resulting data is utilized as input to a machine learning or artificial intelligence model 148, which may process the resulting data to generate prediction outputs 150. In an embodiment, the machine learning or artificial intelligence model 148 implements one or more regression machine learning algorithms that are employed to generate the output scores. These one or more regression machine learning algorithms may include simple linear regression models, lasso regression models, logistic regression models, support vector machines (SVMs), multivariate regression algorithms, multiple regression algorithms, random forest algorithms, and the like.

It should be noted that the aforementioned models and algorithms are supervised machine learning models and algorithms, which may be trained using sample data, including test data 156. For instance, a dataset of sample inputs and known business user rankings and scores can be selected for training of the aforementioned models and algorithms. A machine learning or artificial intelligence model may be evaluated to determine, based on the input sample dataset(s), whether the machine learning or artificial intelligence model is determining the expected rankings and scores for the known omnichannel environments. Based on this evaluation, the machine learning algorithms or models may be updated or otherwise modified to increase the likelihood of the algorithms/models generating the desired results.

In an embodiment, the evaluation and training of the machine learning algorithms or models may be performed by a model definition module 170, which may utilize test data 156 prepared by a performance monitoring module 152 of the prediction engine 140 to test various machine learning algorithms to update or otherwise generate a new machine learning model that may be implemented by the prediction engine 140. In an embodiment, the test data 156 is ingested via a data ingestion process 172 executed by the model definition module 170. The aggregated data is processed and normalized via a data preparation and normalization process 174. The model definition module 170 may further perform a feature extraction process 176, through which the normalized data is evaluated to determine which data elements may have predictive value for the machine learning model. Further, through the feature extraction process 176, the data elements may be prepared for use in machine learning. The feature extraction process 176 may further include deriving additional data, or features, that may also have predictive value based on any existing data.

In an embodiment, the model definition module 170 implements a test algorithms process 178, through which a set of machine learning algorithms are selected for initial processing of the data elements and features provided via the feature extraction process 176. Each of these machine learning algorithms may be iteratively tested by varying its hyperparameters. Once a set of hyperparameters for a machine learning algorithm has been set, the model definition module 170 may build a machine learning model using this set of hyperparameters and a training data set. The output of this machine learning model may be evaluated. Through this iterative process, different machine learning model variants may be identified that perform to a pre-defined specification. These variants may be identified by testing these against the development data set. The test data 156 may be used to ensure that a machine learning model generated via this iterative process performs according to the predefined specification using data that the model has not previously processed.

If an acceptable machine learning model cannot be produced despite trying additional algorithms and associated hyperparameters, the model definition module 170 may obtain additional data that may have predictive value (e.g., historical data, sample data, etc.). Alternatively, if additional data is not required is otherwise not available, the model definition module 170 may perform additional feature extraction via the feature extraction process 176 to identify additional features that may be used to potentially generate an acceptable machine learning model.

In an embodiment, once one or more machine learning models have been identified that produce acceptable results, the model definition module 170 may freeze the best-performing machine learning model 180 and implement this machine learning model 180 in the prediction engine 140 as the new machine learning model 148. The machine learning model 148 may be monitored via the performance monitoring module 152, which may monitor shifts in data that will degrade performance of the machine learning model 148 over time. The performance monitoring module 152 may thus re-tune the machine learning model 148 via the model definition module 170, as described above. For instance, if the performance monitoring module 152 detects a level of degradation that exceeds a predefined threshold, the performance monitoring module 152 may trigger the model definition module 170 to generate a new or updated machine learning model 180 that may be implemented in the prediction engine 140.

In an embodiment, the data analytics system 130 obtains the prediction results 150 from the prediction engine 140 and transmits the prediction results 150 to a conversion assessment module 132 of the omnichannel relevance analysis system 102. The conversion assessment module 132 may be implemented as executable code or instructions executed by a computer system of the omnichannel relevance analysis system 102. Alternatively, the conversion assessment module 132 may be implemented as a stand-alone computer system or application executing on a computer system utilized by the omnichannel relevance analysis system 102. The conversion assessment module 132 may be configured to generate, based on the prediction results 150 provided by the data analytics system 130, recommendations for specific actions the business user 160 may perform to improve their current position within the omnichannel environments and/or platforms specified by the business user 160.

In an embodiment, the conversion assessment module 132 utilizes the prediction results 150 from the data analytics system 130 as input to a machine learning algorithm or artificial intelligence to provide additional insights or recommendations for improving a business user's current position. For example, the conversion assessment module 132 may execute one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on datasets comprising prediction results 150 for the business user 160 over a period of time. In some implementations, a recurrent neural network (RNN) or a convolutional neural network (CNN) may be used to predict correlations between a current ranking and score for particular relevancy attributes and business user 160 interactions with the omnichannel environments and/or platforms specified by the business user 160, as well as any financial data provided by the business user 160 related to the product or product types specified in the original request.

The recommendations determined by the conversion assessment module 132 may be provided to the business user 160 via the user interface 104, which may allow the business user 160 to evaluate the provided recommendations and provide feedback to the omnichannel relevance analysis system 102 with regard to these recommendations. For instance, the business user 160 may implement the provided recommendations internally to attempt improvement of its ranking and score within the various omnichannel environments of interest. In an embodiment, the business user 160 can indicate, via the user interface 104, any recommendations adhered to for improvement of its ranking and score within the omnichannel environments specified by the business user 160. The omnichannel relevance analysis system 102, via the data analytics system 130, may use this information, as well as the updated ranking and score for the business user 160, to determine the impact of these recommendations. The identified impact (whether positive or negative) may be used to train the myriad machine learning or artificial intelligence algorithms used to generate the prediction outputs and recommendations for the business user 160.

Figure 2:
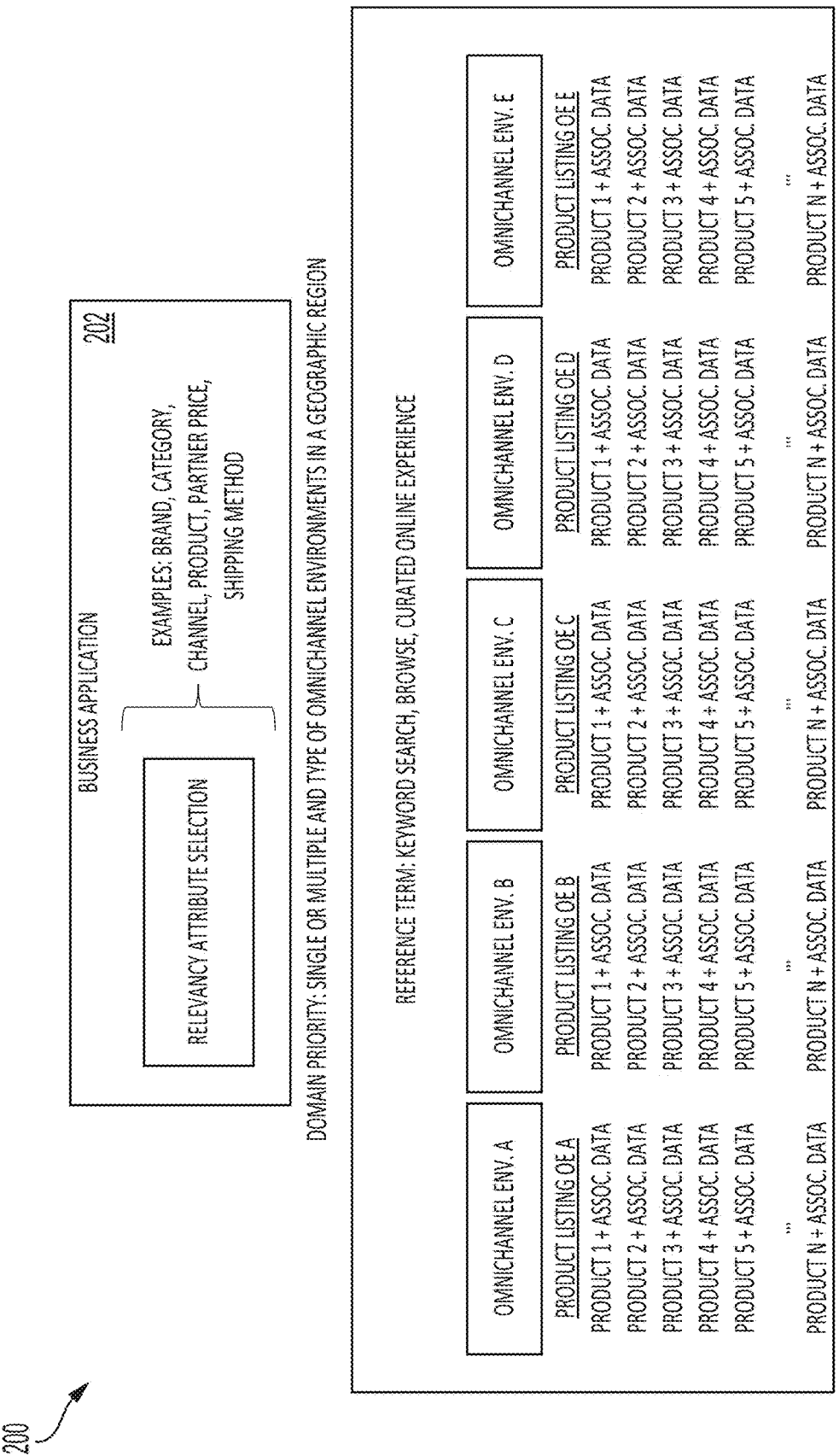
FIG. 2 shows exemplary components of a method for omnichannel relevance indexing, ranking, and scoring in accordance with at least one embodiment.

FIG. 2 illustrates exemplary components 200 of a method for eCommerce relevance indexing and scoring. As illustrated, such components may include a business application 202 for defining relevancy attribute selection, domain priority, discoverability weighting, and conversion driver significance. The business application 202 may provide a user interface, such as user interface 104 described above in connection with FIGS. 1A-1B, through which the business user selects and specifies relevancy attributes applicable to their business goals, model, and product strategy. The user interface is provided through a web browser or user application interface and supports various use cases such as private label, competitive coverage, and new business opportunity identification. The business user selects and characterizes the relevancy attributes that may include inter alia brand, category, channel, product type, price, and shipping method. A business user may also define its domain priority as either single, multiple, or collective omnichannel environments, and the specific geographical region. Additional components may include identification of the specific online omnichannel environments with which the business user engages which can be intended or unintended, as well as the specific products and product lines listed in each omnichannel environment. The analytics performed by the omnichannel relevance analysis system may further account for products retrieved and sold as a result of keyword search, browsing, and curation. Conversion factors contributing to weighting may also be identified.

The omnichannel environment relevance index score calculated by the omnichannel relevance analysis system may be based on these key inputs: relevancy attribute selection, domain priority, discoverability weighting, and conversion driver significance.

Relevancy Attribute Selection: This input is derived from given products or product sets defined or otherwise provided by the business user and can take the form of an attribute type such as a brand name, product title and/or product identifier. Examples of relevancy attributes include a brand name, product type, product rating, category, style, price, shipping method, first party, drop ship, or third party channel, seller performance, types of sellers, and geographic region. Relevancy attributes may further include user ratings and reviews, type and intensity of omnichannel environment advertising, social media integration and other emerging omnichannel environment data sets. Relevancy attributes are often combinations of sets of attributes that can employ priority, distribution, and hierarchy.

Domain Priority: This set of inputs can specify a single or multiple omnichannel environment platforms, comprising various types of entities such as physical (e.g., "brick and mortar") stores and online entities who may deploy a variety of channels including wholesale, drop ship, and third party channels, across geographic regions. Domain priorities can be assigned across these inputs, or domains, to understand the relative position and importance of the attribute. It is often advantageous to prioritize multiple omnichannel environments as part of this domain priority due to the variation of contributing data sets which need to be normalized in order to provide a broader representative data set. Domain Priority also takes into consideration the format of digital delivery including mobile, desktop, web browser and application.

Figure 3:
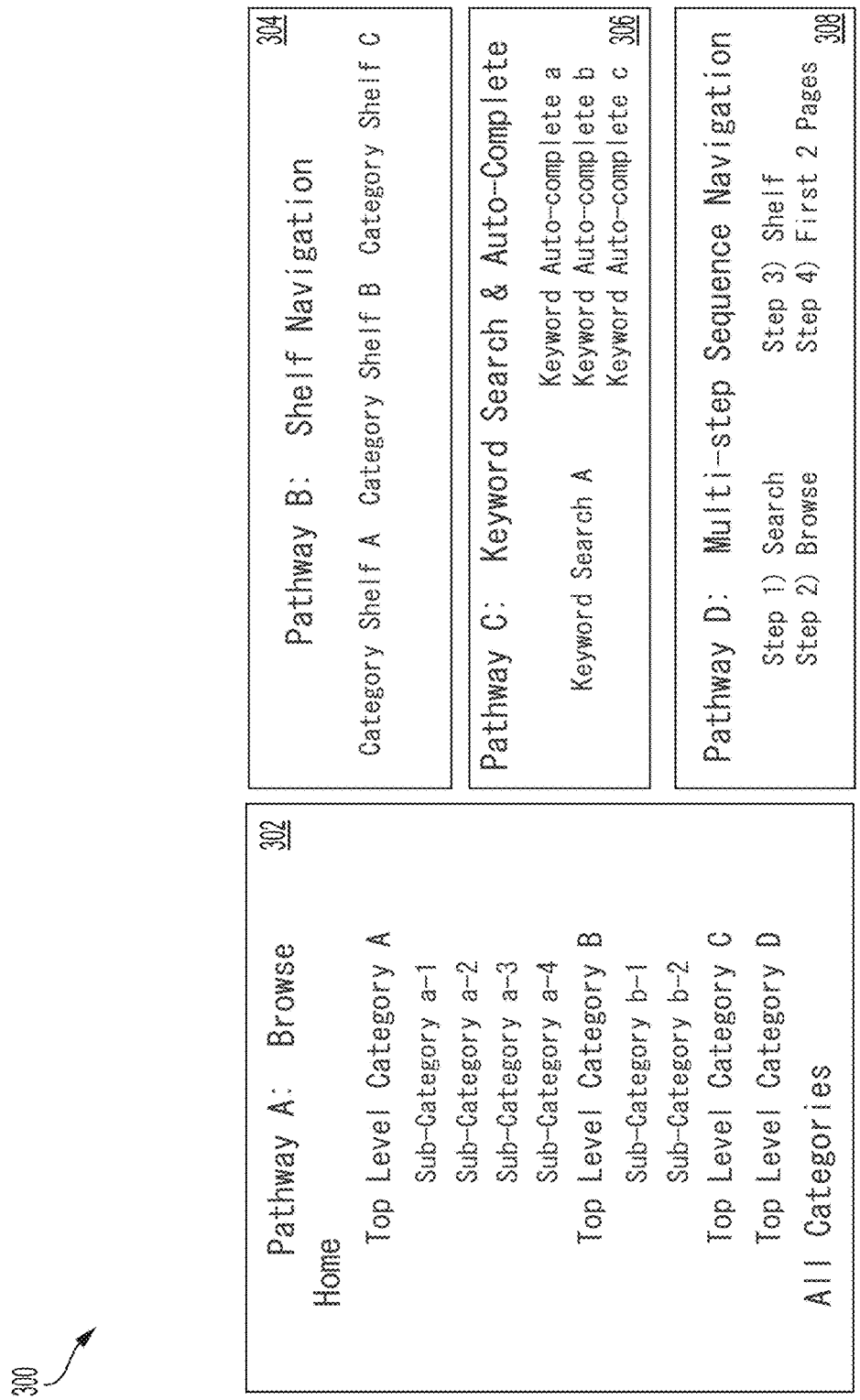
FIG. 3 shows an illustrative example of various user navigation pathways across multiple domain priorities utilized to generate resulting product data sets from various omnichannel environment platforms in accordance with at least one embodiment.

Discoverability Weighting and Ranking: Based on the relevancy attribution selection, FIG. 3 shows how various user navigation pathways 300 across multiple domain priorities generate resulting product data sets from the omnichannel environment platforms. User navigation pathways can include browsing 302, digital shelf navigation 304, a singular keyword search 306, and/or a multi-step sequence 308. The omnichannel environment platforms and their corresponding algorithms present relevant user-facing data in the form of product listings and sponsored digital advertisements in the order that have the most potential for user discovery. The products that occupy the top listing position are weighted to have higher current exposure potential and subsequent follow-on listings are weighted accordingly.

Figure 4:
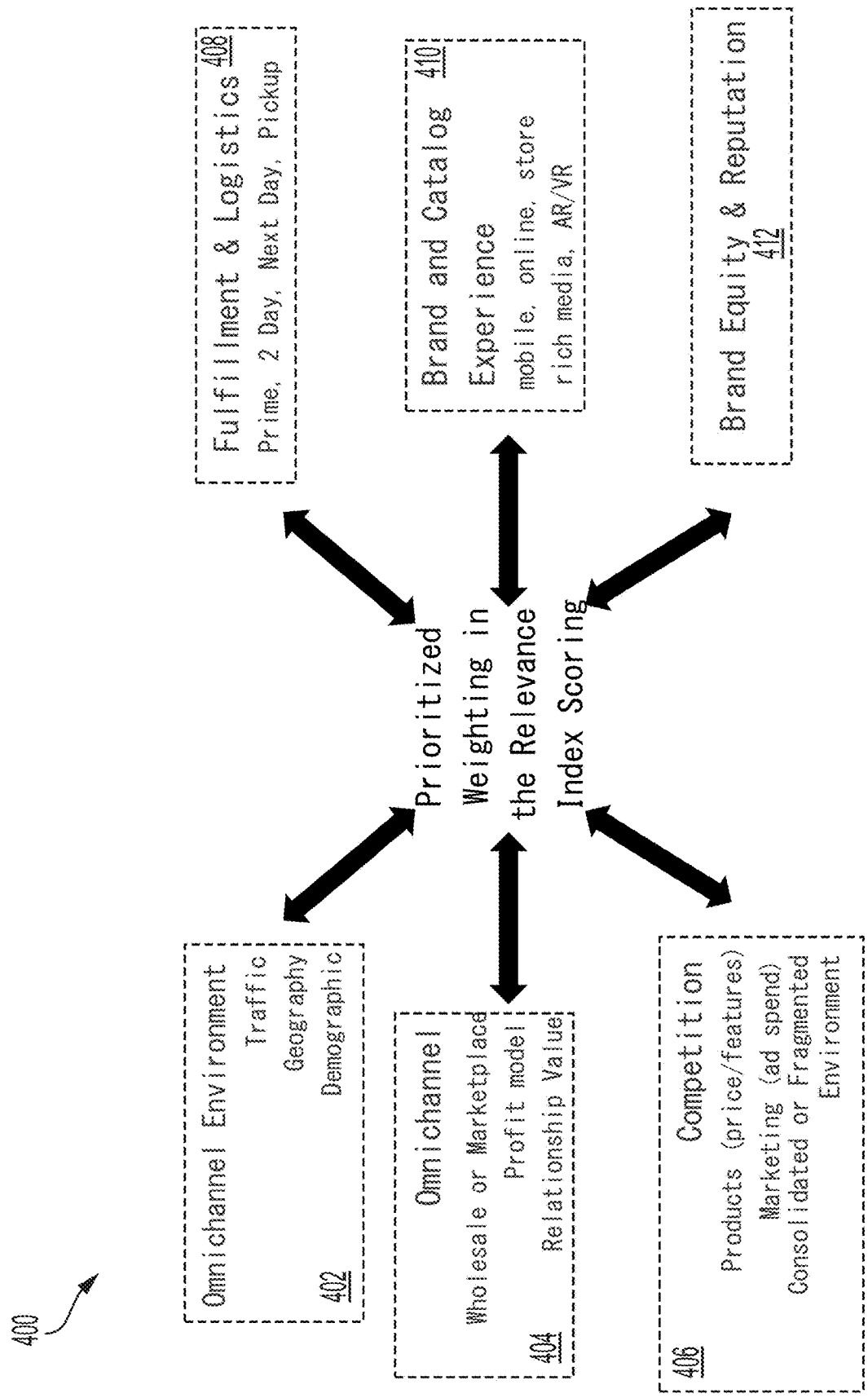
FIG. 4 shows an illustrative example of a set of conversion drivers that represent external factors to an online omnichannel environment that can impact potential and conversion in accordance with at least one embodiment.

Conversion Drivers: FIG. 4 shows the set of variables 400 that represent external factors to the online omnichannel environment yet can significantly impact the potential often referred to as conversion. For instance, as illustrated in FIG. 4, the conversion drivers that may drive prioritized weighting in the relevance index scoring performed by the data analytics system 130 described above in connection with FIGS. 1A-1B may include omnichannel environment traffic (physical and network) 402, omnichannel information 404 (e.g., wholesale or marketplace, profit models, relationship values, etc.), competition information 406, fulfillment and logistics information 408, brand and catalog experience information 410, and brand equity and reputation information 412. Additional examples of these conversion drivers may include brand recognition, product ratings, ad exposure, new product innovation, and the like. As omnichannel eCommerce offers users more buying choices and avenues offline and online, these conversion drivers can increase in prevalence and impact.

As noted above, the omnichannel eCommerce index, ranking and scoring is based on a set of algorithms that incorporates the rank of the resultant product listing, r, the relevant size of data set, n, and the number and weighting of the inputs as described above, which varies based on product category and omnichannel environment. The business user can select a value for n that is suitable for their brand and product categories for the most accurate relevancy ranking. A greater value for n can be selected to increase the scope of discoverability weighting ranking to see the broadest range of participating players in an environment and a smaller value for n can be selected to focus on securing brand leadership. The value of n can also be based on the number of quality results that should be considered which can often vary based on the search results from a specific omnichannel environment platform.

The raw input data set is processed and normalized prior to use within machine learning algorithms. This step is commonly called "data preparation". A critical step is to determine which variables and/or their derivatives will have the best impact on the outputs. This process is commonly called "feature engineering." These processes are described above in greater detail in connection with FIGS. 1A-1B and are implemented using the data analytics system 130, as described herein.

The output generated by the data analytics system 130 is a real number (as opposed to a class) corresponding to a percent share of the environment for users shopping for a specific product. As such, regression machine learning algorithms are employed to generate the output scores, such as support vector regression, decision trees, random forest, and lasso. In an embodiment, the specific algorithms can be modified or changed based on the performance of the algorithms as the inputs and the outputs of feature engineering change. The output may be a real number between 0 and 100, although other scoring metrics or representations may be used to represent a share for a specific product (e.g., letter grading, icons, etc.).

The machine learning model implemented by the omnichannel relevance analysis system provides the business user with a rank and score of their relative positioning in comparison to their known and often unknown competitors. This process identifies possible competitors based on discoverability weighting and ranking. The score represents the percent share of the environment for users shopping for a specific product. For example, if the relevancy attribute selection is "Brand" and the omnichannel relevance analysis system is measuring for "Brand Relevance", the "Brand Relevance" rank can be used to determine if a business user's brand is in the top 10 and the associated share of the total environment that this brand has based on the calculated score. The discoverability weighting provides a precise level of relevance such as narrow price bands, user ratings at or above a certain rating level, and full extensibility to the attributes and filters that are user facing on the omnichannel environment platforms.

The machine learning or artificial intelligence algorithms implemented by the omnichannel relevance analysis system also takes financial data as input, such as the actual or estimated revenue of a product and actual or estimated profit margin of a product. This allows for further decision making to understand the financial value and impact of each unit improvement in the relevance score. These algorithms are extensible with the discovery of additional input variables (e.g., ad spend, product information quality) to further improve the value of the scoring results for specific products, brands, categories, and companies.

Figure 5:
FIG. 5 shows an illustrative example of an output of an interface configured to display data regarding brand relevance in accordance with at least one embodiment.

FIG. 5 shows an exemplary output 500 of an interface that displays data regarding brand relevance, which includes index scoring and ranking with one relevance omnichannel environment and one relevance reference term. In the illustrative example illustrated in FIG. 5, a brand relevance score of 32.4 out of 100 for Symple Stuff may indicate that this brand captures 32.4% of current share and user discoverability for ergonomic desks in the retailer A omnichannel environment. Business users that otherwise obtain a lower score may now understand their share of user discovery and potential in this particular category. Now informed by the product features, capabilities and pricing of the environment leader, they can develop a plan of action to gain awareness and offer a lower price and even build a better product.

There are multiple sets of these index scores based upon variations of these factors. As well, these scores can be combined and added to provide additional insight into coverage and new opportunities, including representation of portfolio value of a user's brands and products across multiple different categories.

There are several applications for omnichannel environment relevancy scoring beyond brand score. Omnichannel environment relevance scores and rankings provide environment position, percentage of share by omnichannel environment for desired omnichannel environment categories or combinations of user flows. Private label relevance scores and rankings provide insights into the intent and opportunity size. As an example, a business user may be able to understand, based on the relevance scores and rankings provided by the omnichannel relevance analysis system, that on a particular omnichannel environment, the biggest competitor may be the omnichannel environment platform itself. This insight may alter the growth path and investment for business users. In short, there are as many different types of eCommerce relevancy scores as there are relevancy attributes and domains, which is limitless as the business dynamics change in the hypercompetitive landscape of eCommerce.

These sets of relevancy scores are often aggregated to provide additional insights into coverage by highlighting new environment opportunities where a business user can choose to enter with additional marketing spend, product innovation, and improved digital product content approaches. These sets of relevancy scores can represent horizontal or vertical relevancy score combinations. A horizontal combination of eCommerce relevancy scores can be used to understand a business user's brand position across multiple omnichannel environments, categories, and shipping options. For example, a business user can have multiple private label brands they are selling on their own omnichannel environment site as well as on five different omnichannel environments. In this example, for a home décor retailer that has ten different private label brands, each with varying share, the aggregate sum of share across all of this specific retailer's portfolio of brands is the most accurate representation of their share of the environment on these omnichannel environments.

A vertical relevancy score combination may include several different scores for a defined brand across omnichannel environment, categories, pricing band, packaging, room, material, and the like. In an example, for a home décor lighting brand, there may be a collection of eCommerce relevancy scores across multiple omnichannel environments, categories including table lamps, floor lamps, desk lamps, between $60-$200, sold as a single or set, living room, bedroom, office, and lamp color, material and finish such as ceramic, brushed nickel, and black.

FIG. 6 shows an example of brand relevance index brand ranking 600 across multiple omnichannel environments. With this perspective, a business user can compare their relative share across multiple channels to assess their environment position across the eCommerce landscape, prioritize actions to improve their position, and most importantly, have a baseline and measurement methodology to improve their online business over time.

This approach to benchmarking a business user's brand position on a global omnichannel environment with a relevance index, score, and rank of user discoverability provides the business user and product decision makers the ability to confidently understand their current status and business opportunity. By associating the brand relevance score with metrics for a particular reference term, the business user can more readily size the economic value and upside of their current position as well as approximate the incremental opportunity resulting from an improved share position as measured by increase in brand relevance score.

An important aspect of the omnichannel relevance analysis system and of the relevance attribute index, scoring, and ranking algorithms and methods is their usage to baseline important and impactful business dimensions in characterizing the strengths and weaknesses of a business user (e.g., supplier/retailer) and their portfolio of brands across global omnichannel environments. Once these initial scenarios are defined, measured, and understood, then automation allows for tracking, measuring and reporting over time. With this analytics system in place that provides for real time adjustments of conversion drivers to eCommerce performance, business users may be able to adjust and fine tune their business.

With this omnichannel relevance analysis system and relevance attribute index, scoring, and ranking approach, a business user can make strategic decisions related to their product offering to optimize maximum conversions across multiple omnichannel environments within the categories, channels, and partners that matter to their business. Key advantages may include at least:

1. A consistent methodology to assess business user performance across many different omnichannel environment websites, both domestically and internationally.

2. A primary measure for user discovery and product relevancy in the highly chaotic omnichannel environment which unifies multiple organizational teams across products, marketing, and functions to focus on shared goals.

3. A greater understanding of competitive standing in the environment, which provides business users with insights to user preferences of product features and benefits, product form factor such as packaging and pricing. From here, a business user can invest in marketing and develop effective go to strategies and deploy marketing spend that will yield a higher return on investment.

4. Requiring the business user to decide how they want to be discovered by the user beyond just searching by brand. This may cause the business user to determine when, where and how the business user wants to be discovered by the user on a global omnichannel environment. With the eCommerce relevance index, limited resources can be deployed with highest impact and measurable outcomes.

5. The omnichannel relevance analysis system provides a way for a business user to keep track of their brand and product from a portfolio approach through validation and confirmation of their environment position and potential where it matters most to their business and presence on the online omnichannel environments.

6. The underlying machine-learning based approach may further provide additional advantages. For instance, as more data is generated during the normal course of business, the precision and accuracy of the provided metrics will continually improve. Further, continual improvement of metrics through use of new kinds of data provided by customers or elsewhere can enhance the already-described key inputs or provide new inputs that result in improvements. Another advantage may include providing inherent robustness that evolves quickly as the industry, environment dynamic, and customer strategy changes through new and improved metrics. The machine-learning based approach may also enable improved ability to predict metrics that are highly valuable for customers.

Figure 7:
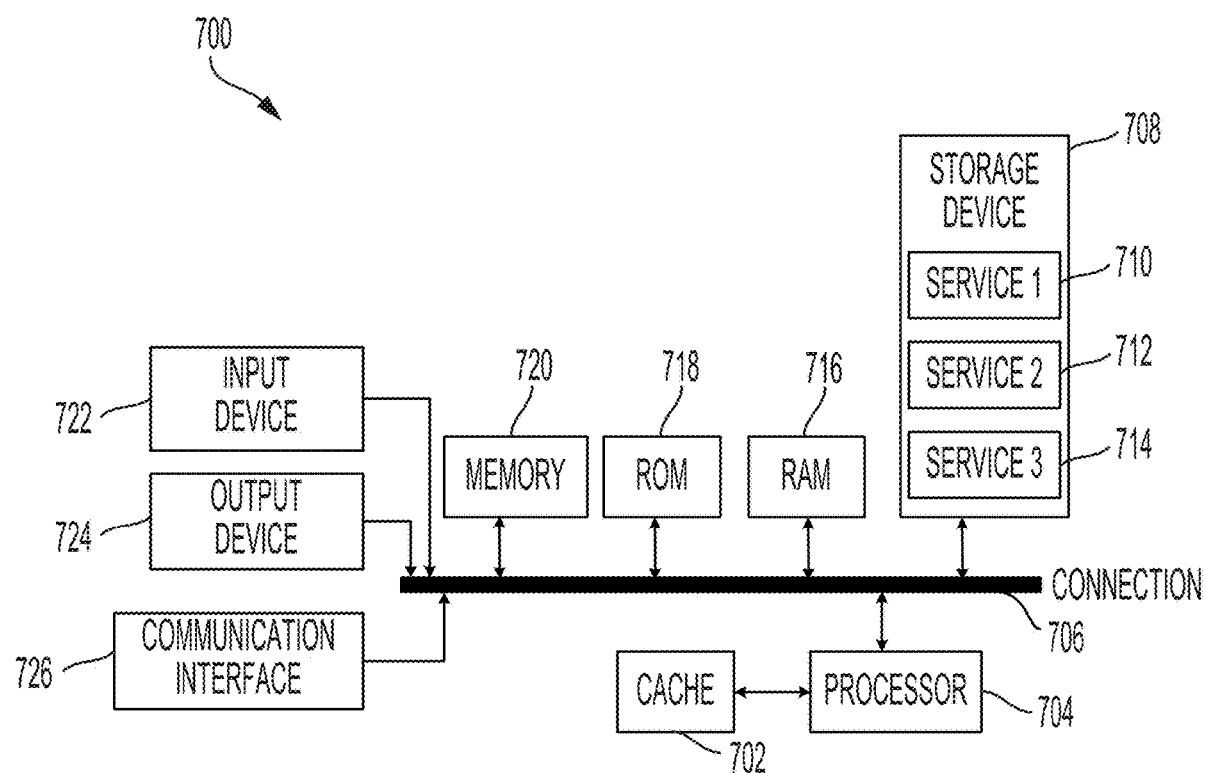
FIG. 7 shows an illustrative example of an environment in which various embodiments can be implemented.

FIG. 7 illustrates a computing system architecture 700 including various components in electrical communication with each other using a connection 706, such as a bus, in accordance with some implementations. Example system architecture 700 includes a processing unit (CPU or processor) 704 and a system connection 706 that couples various system components including the system memory 720, such as ROM 718 and RAM 716, to the processor 704. The system architecture 700 can include a cache 702 of high-speed memory connected directly with, in close proximity to, or integrated as part of the processor 704. The system architecture 700 can copy data from the memory 720 and/or the storage device 708 to the cache 702 for quick access by the processor 704. In this way, the cache can provide a performance boost that avoids processor 704 delays while waiting for data. These and other modules can control or be configured to control the processor 704 to perform various actions.

Other system memory 720 may be available for use as well. The memory 720 can include multiple different types of memory with different performance characteristics. The processor 704 can include any general purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing system architecture 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system architecture 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, RAMs 716, ROM 718, and hybrids thereof.

The storage device 708 can include services 710, 712, 714 for controlling the processor 704. Other hardware or software modules are contemplated. The storage device 708 can be connected to the system connection 706. In one aspect, a hardware module that performs a particular function can include the software component stored in a computer-readable medium in connection with the necessary hardware components, such as the processor 704, connection 706, output device 724, and so forth, to carry out the function.

The disclosed methods can be performed using a computing system. An example computing system can include a processor (e.g., a central processing unit), memory, non-volatile memory, and an interface device. The memory may store data and/or one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually affect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
    receiving a request to obtain an omnichannel relevance index for a product;
    identifying a set of domain priorities, wherein the set of domain priorities correspond to one or more platforms through which the product is made available;
    obtaining product data sets associated with the one or more platforms through which the product is made available, wherein the product data sets are obtained via navigation pathways across the set of domain priorities, wherein the product data sets include data corresponding to the product and a set of other products, and wherein the data is weighted based on listing positions of the product and the set of other products within the one or more platforms;
    normalizing the product data sets to generate normalized product data sets;
    generating one or more machine learning algorithms to provide a score based on the normalized product data sets, wherein the one or more machine learning algorithms are generated by iteratively varying a set of hyperparameters associated with the one or more machine learning algorithms according to a test data set and a predefined specification;
    processing the normalized product data sets through the one or more machine learning algorithms to generate the score;
    generating the omnichannel relevance index for the product and a set of recommendations for improving the omnichannel relevance index, wherein the omnichannel relevance index and the set of recommendations are generated based on the score, and wherein the omnichannel relevance index indicates a position of the product in relation to the set of other products;
    receiving feedback resulting from implementation of the set of recommendations; and
    updating the set of hyperparameters associated with the one or more machine learning algorithms based on the feedback.

2. The computer-implemented method of claim 1, wherein the request specifies a set of omnichannel relevancy attributes, wherein the set of omnichannel relevancy attributes includes at least one of a brand, a category, a channel, a product type, and a shipping method associated with the product, and wherein the data includes information according to the set of omnichannel relevancy attributes.

3. The computer-implemented method of claim 1, wherein the omnichannel relevance index corresponds to a discoverability of the product within the one or more platforms.

4. The computer-implemented method of claim 1, further comprising:
   identifying a set of conversion drivers associated with the product and the set of other products; and
   adjusting the omnichannel relevance index based on the set of conversion drivers.

5. The computer-implemented method of claim 1, wherein:
   the request specifies performance data associated with the product; and
   the computer-implemented method further comprises determining a metric corresponding to improvement in the omnichannel relevance index, wherein the metric is determined using the performance data.

6. The computer-implemented method of claim 1, wherein identifying the set of domain priorities further includes:
   submitting one or more product queries according to the one or more platforms, wherein the one or more product queries correspond to the product; and
   identifying one or more domain priorities based on the one or more product queries.

7. The computer-implemented method of claim 1, further comprising:
   generating a ranking of the product and the set of other products, wherein the ranking is generated according to the score and a set of other scores corresponding to the set of other products, and wherein the position of the product is determined based on the ranking.

8. A system, comprising:
   one or more processors; and
   memory storing thereon instructions that, as a result of being executed by the one or more processors, cause the system to:
   receive a request to obtain an omnichannel relevance index for a product;
   identify a set of domain priorities, wherein the set of domain priorities correspond to one or more platforms through which the product is made available;
   obtain product data sets associated with the one or more platforms through which the product is made available, wherein the product data sets are obtained via navigation pathways across the set of domain priorities, wherein the product data sets include data corresponding to the product and a set of other products, and wherein the data is weighted based on listing positions of the product and the set of other products within the one or more platforms;
   normalize the product data sets to generate normalized product data sets;
   generate one or more machine learning algorithms to provide a score based on the normalized product data sets, wherein the one or more machine learning algorithms are generated by iteratively varying a set of hyperparameters associated with the one or more machine learning algorithms according to a test data set and a predefined specification;
   process the normalized product data sets through the one or more machine learning algorithms to generate the score;
   generate the omnichannel relevance index for the product and a set of recommendations for improving the omnichannel relevance index, wherein the omnichannel relevance index and the set of recommendations are generated based on the score, and wherein the omnichannel relevance index indicates a position of the product in relation to the set of other products;
   receive feedback resulting from implementation of the set of recommendations; and
   update the set of hyperparameters associated with the one or more machine learning algorithms based on the feedback.

9. The system of claim 8, wherein:
   the request specifies performance data associated with the product; and
   the instructions further cause the system to calculate a metric corresponding to improvement in the omnichannel relevance index, wherein the metric is determined using the performance data.

10. The system of claim 8, wherein the instructions further cause the system to:
    identify a set of conversion drivers associated with the product and the set of other products; and
    adjust the omnichannel relevance index based on the set of conversion drivers.

11. The system of claim 8, wherein the omnichannel relevance index corresponds to a discoverability of the product within the one or more platforms.

12. The system of claim 8, wherein the request specifies a set of omnichannel relevancy attributes, wherein the set of omnichannel relevancy attributes includes at least one of a brand, a category, a channel, a product type, and a shipping method associated with the product, and wherein the data includes information according to the set of omnichannel relevancy attributes.

13. The system of claim 8, wherein the instructions that cause the system to identify the set of domain priorities further cause the system to:
    submit one or more product queries according to the one or more platforms, wherein the one or more product queries correspond to the product; and
    identify one or more domain priorities based on the one or more product queries.

14. The system of claim 8, wherein the instructions further cause the system to:
    generate a ranking of the product and the set of other products, wherein the ranking is generated according to the score and a set of other scores corresponding to the set of other products, and wherein the position of the product is determined based on the ranking.

15. A non-transitory, computer-readable storage medium storing thereon executable instructions that, as a result of being executed by one or more processors of a computer system, cause the computer system to:
    receive a request to obtain an omnichannel relevance index for a product;
    identify a set of domain priorities, wherein the set of domain priorities correspond to one or more platforms through which the product is made available;
    obtain product data sets associated with the one or more platforms through which the product is made available, wherein the product data sets are obtained via navigation pathways across the set of domain priorities, wherein the product data sets include data corresponding to the product and a set of other products, and wherein the data is weighted based on listing positions of the product and the set of other products within the one or more platforms;

normalize the product data sets to generate normalized product data sets;

generate one or more machine learning algorithms to provide a score based on the normalized product data sets, wherein the one or more machine learning algorithms are generated by iteratively varying a set of hyperparameters associated with the one or more machine learning algorithms according to a test data set and a predefined specification;

process the normalized product data sets through the one or more machine learning algorithms to generate the score;

generate the omnichannel relevance index for the product and a set of recommendations for improving the omnichannel relevance index, wherein the omnichannel relevance index and the set of recommendations are generated based on the score, and wherein the omnichannel relevance index indicates a position of the product in relation to the set of other products;

receive feedback resulting from implementation of the set of recommendations; and update the set of hyperparameters associated with the one or more machine learning algorithms based on the feedback.

16. The non-transitory, computer-readable storage medium of claim 15, wherein the executable instructions further cause the computer system to:

identify a set of conversion drivers associated with the product and the set of other products; and adjust the omnichannel relevance index based on the set of conversion drivers.

17. The non-transitory, computer-readable storage medium of claim 15, wherein:

the request specifies performance data associated with the product; and the executable instructions further cause the computer system to calculate a metric corresponding to improvement in the omnichannel relevance index, wherein the metric is determined using the performance data.

18. The non-transitory, computer-readable storage medium of claim 15, wherein the omnichannel relevance index corresponds to a discoverability of the product within the one or more platforms.

19. The non-transitory, computer-readable storage medium of claim 15, wherein the executable instructions that cause the computer system to identify the set of domain priorities further cause the computer system to:

submit one or more product queries according to the one or more platforms, wherein the one or more product queries correspond to the product; and identify one or more domain priorities based on the one or more product queries.

20. The non-transitory, computer-readable storage medium of claim 15, wherein the executable instructions further cause the computer system to:

generate a ranking of the product and the set of other products, wherein the ranking is generated according to the score and a set of other scores corresponding to the set of other products, and wherein the position of the product is determined based on the ranking.

* * * * *